United States Patent [19]
Hodges

[11] Patent Number: 5,835,694
[45] Date of Patent: Nov. 10, 1998

[54] RAID-CONFIGURED DISK DRIVE ARRAY WHEREIN ARRAY CONTROL OCCURS AT THE DISK DRIVE LEVEL

[75] Inventor: Paul Hodges, San Jose, Calif.

[73] Assignee: International Business Machines Corporation, Armonk, N.Y.

[21] Appl. No.: 761,489

[22] Filed: Dec. 6, 1996

[51] Int. Cl.$^6$ .................................................. G06F 11/00
[52] U.S. Cl. ................................ 395/182.04; 711/114
[58] Field of Search ............................... 395/180, 182.03, 395/182.04, 182.05; 711/100, 114

[56] References Cited

U.S. PATENT DOCUMENTS

| | | | |
|---|---|---|---|
| 5,257,391 | 10/1993 | DuLac et al. | 395/182.04 |
| 5,287,462 | 2/1994 | Jibbe et al. | |
| 5,303,244 | 4/1994 | Watson | 395/182.04 |
| 5,345,565 | 9/1994 | Jibbe et al. | 371/49.2 |
| 5,388,108 | 2/1995 | DeMoss et al. | 371/51.1 |
| 5,440,716 | 8/1995 | Schultz et al. | 711/114 |
| 5,446,855 | 8/1995 | Dang et al. | 711/114 |
| 5,463,765 | 10/1995 | Kakuta et al. | 395/182.04 |
| 5,530,948 | 6/1996 | Islam | 395/182.04 |
| 5,566,316 | 10/1996 | Fechner et al. | 395/182.04 |
| 5,574,851 | 11/1996 | Rathunde | 395/182.05 |
| 5,634,033 | 5/1997 | Stewart et al. | 395/182.04 |
| 5,651,132 | 7/1997 | Honda et al. | 395/182.04 |
| 5,673,412 | 9/1997 | Kamo et al. | 711/114 |
| 5,689,678 | 11/1997 | Stallmo et al. | 711/114 |
| 5,696,933 | 12/1997 | Itoh et al. | 711/114 |
| 5,701,406 | 12/1997 | Matsumoto et al. | 395/182.04 |

OTHER PUBLICATIONS

Seagate Technology, Rev. 1.5, Jul. 13, 1994, "Raid 5 Support on SCSI Disk Drives", p. 1–30.
Seagate Technology, X3T10/94–111r9, "XOR Commands on SCSI Disk Drives", p. 1–30.

*Primary Examiner*—Albert Decady
*Attorney, Agent, or Firm*—Ohlandt, Greeley, Ruggiero & Perle

[57] ABSTRACT

A data processing system incorporating the invention hereof, includes a host processor or server, connected to an array of disk drives which are further interconnected via a network. Each disk drive is logically divided into plural logical memory segments and, in the preferred embodiment, corresponding logical memory segments in each disk drive are arranged as a parity set in a RAID fashion. The host processor includes a driver which generates read and write commands to the array of disk drives. The commands include addresses which are in accord with ranges of addresses assigned to logical memory segments in each disk drive. Each disk drive stores an array configuration page which includes data that identifies a logical memory segment size; a first identifier for the disk drive that incorporates the respective memory segment; and a second identifier for the last disk drive which stores parity for the parity set including the logical memory segment. Each disk drive includes a controller for determining from the logical memory segment size and the second identifier, which logical memory segment in the respective memory stores parity data. The controller responds to an address accompanying a read or write command by mapping the address to a logical memory segment, other than the logical memory segment in the respective memory which stores parity data. Further, the controller, upon performing a write action to a logical memory segment, communicates directly with the disk drive that stores parity for the parity set of which the logical memory segment is a part and causes an update of that parity segment in accordance with the write action.

16 Claims, 11 Drawing Sheets

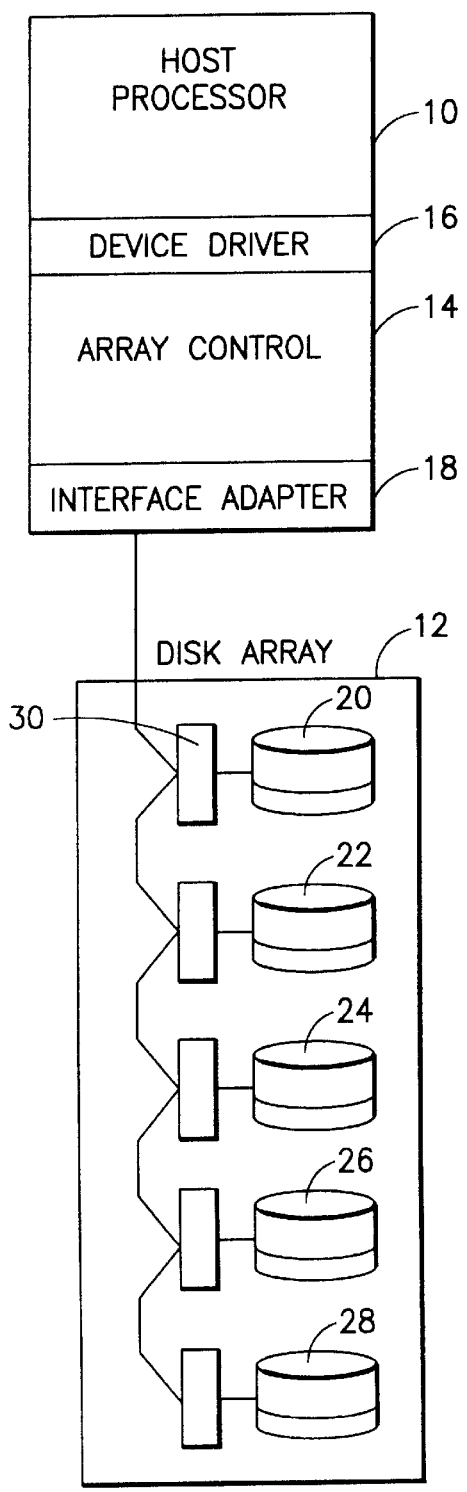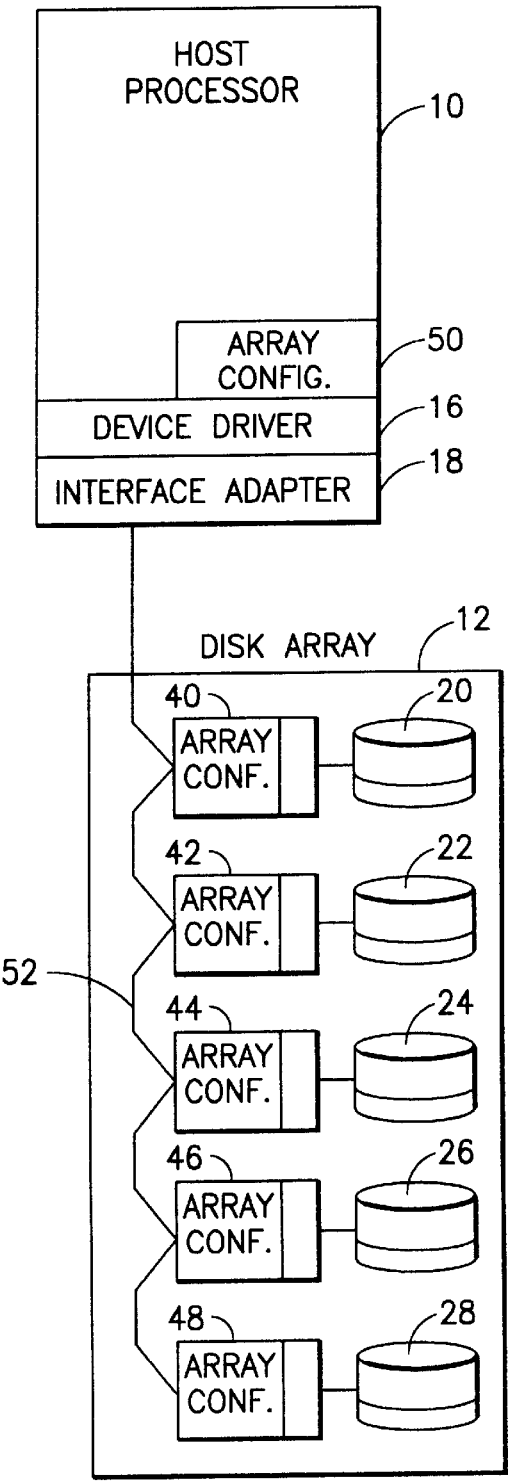
FIG.1
PRIOR ART
FIG.2

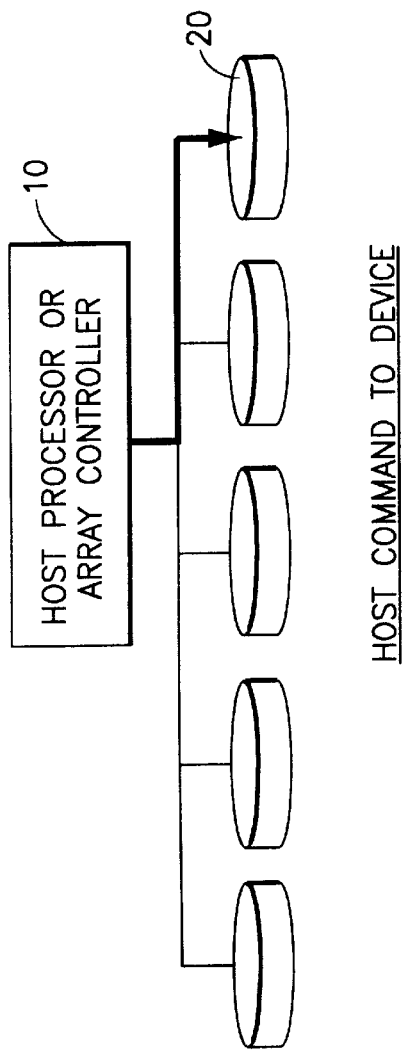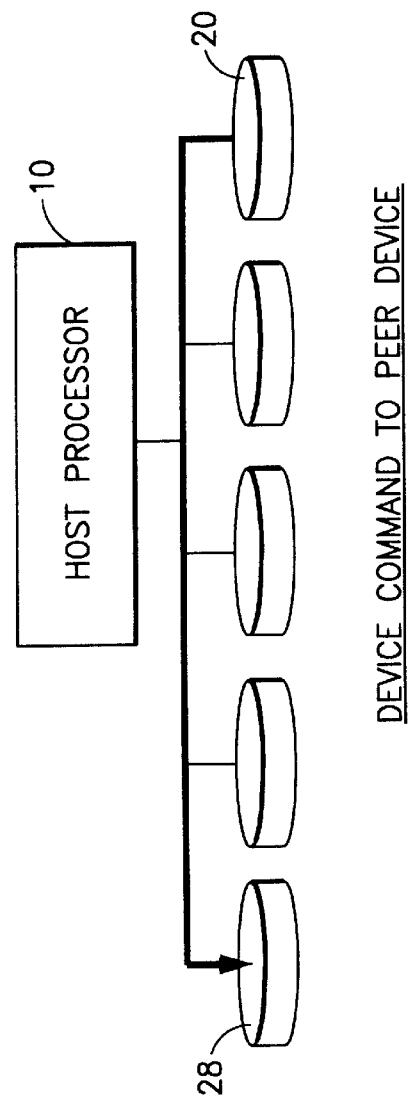

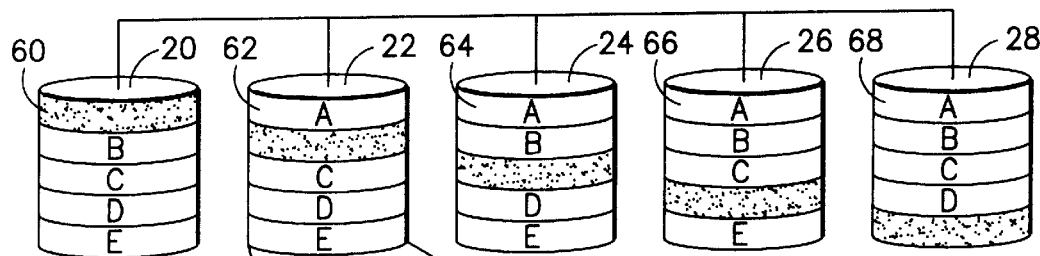
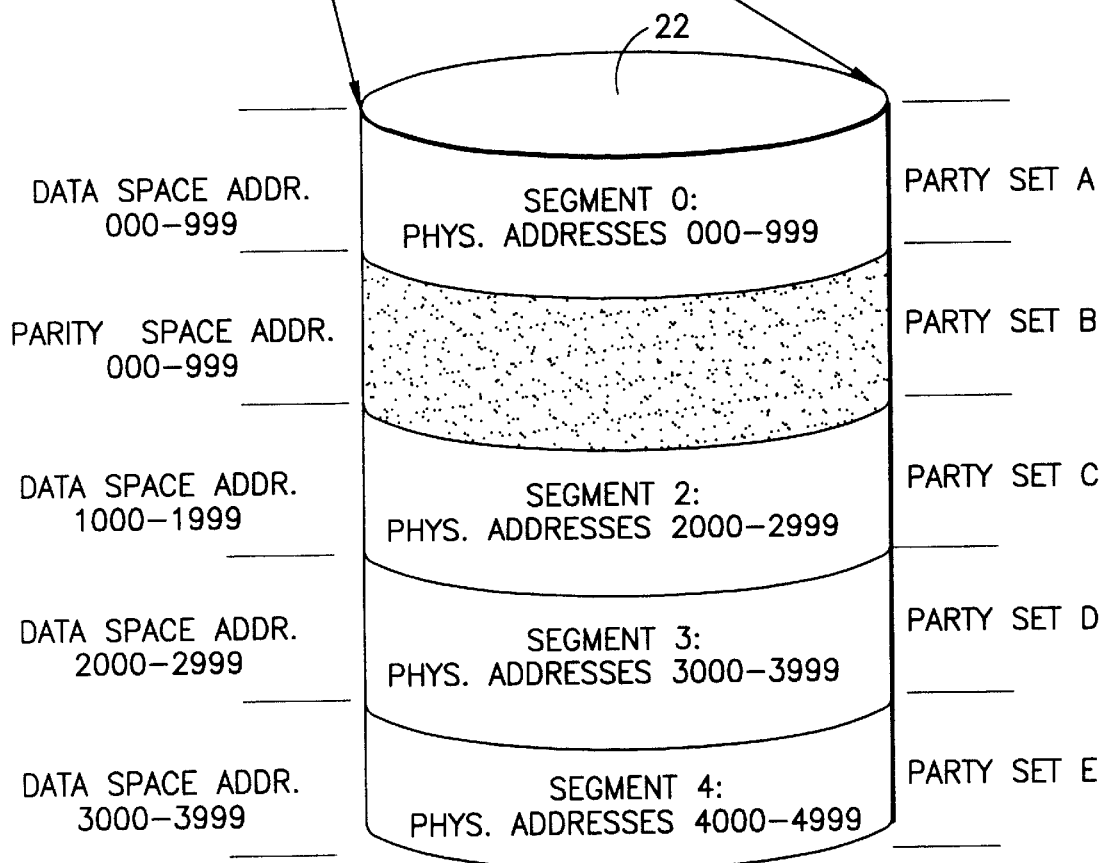

| DRIVE ADDRESS LIST INDEX | 0 | 1 | 2 | 3 | 4 |
|---|---|---|---|---|---|
| | | 100 | 102 | 104 | 106 | 108 |
| | A | | | | | |
| PHYSICAL SEGMENT 0: PHYSICAL BLOCKS 0000-1023 | PARITY SEGMENT 0: BLOCKS 0000-1023 | DATA SEGMENT 0: BLOCKS 0000-1023 | DATA SEGMENT 0: BLOCKS 0000-1023 | DATA SEGMENT 0: BLOCKS 0000-1023 | DATA SEGMENT 0: BLOCKS 0000-1023 |
| PHYSICAL SEGMENT 1: PHYSICAL BLOCKS 1024-2047 | DATA SEGMENT 0: BLOCKS 0000-1023 | PARITY 110 SEGMENT 0: BLOCKS 0000-1023 | DATA SEGMENT 1: BLOCKS 1024-2047 | DATA SEGMENT 1: BLOCKS 1024-2047 | DATA SEGMENT 1: BLOCKS 1024-2047 |
| PHYSICAL SEGMENT 2: PHYSICAL BLOCKS 2048-3071 | DATA SEGMENT 1: BLOCKS 1024-2047 | DATA SEGMENT 1: BLOCKS 1024-2047 | PARITY SEGMENT 0: BLOCKS 0000-1023 | DATA SEGMENT 2: BLOCKS 2048-3071 | DATA SEGMENT 2: BLOCKS 2048-3071 |
| PHYSICAL SEGMENT 3: PHYSICAL BLOCKS 3072-4095 | DATA SEGMENT 2: BLOCKS 2048-3071 | DATA SEGMENT 2: BLOCKS 2048-3071 | DATA SEGMENT 2: BLOCKS 2048-3071 | PARITY SEGMENT 0: BLOCKS 0000-1023 | DATA SEGMENT 3: BLOCKS 3072-4095 |
| PHYSICAL SEGMENT 4: PHYSICAL BLOCKS 4096-5119 | DATA SEGMENT 3: BLOCKS 3072-4095 | DATA SEGMENT 3: BLOCKS 3072-4095 | DATA SEGMENT 3: BLOCKS 3072-4095 | DATA SEGMENT 3: BLOCKS 3072-4095 | PARITY SEGMENT 0: BLOCKS 0000-1023 |

FIG.6

RAID-CONFIGURED DISK DRIVE ARRAY WHEREIN ARRAY CONTROL OCCURS AT THE DISK DRIVE LEVEL

FIELD OF THE INVENTION

This invention relates to disk drive storage arrays for computer systems and, more particularly, to a RAID-configured disk drive array wherein principal control functions for the array are implemented at the disk drive level, thereby removing certain array control functions from a host processor.

BACKGROUND OF THE INVENTION

In 1988, Patterson et al. in "A Case for Redundant Arrays of Inexpensive Disks (RAID)", ACM Sigmod Conference, Chicago, Ill., Jun. 1–3, 1988, pages 109–116, argued that arrays of small disk drives with various built-in parity arrangements would provide equivalent performance, reliability and scalability to the then-present large magnetic disk systems. A variety of parity arrangements were described by Patterson et al., which have since become known as RAID 1–5 configurations.

A RAID 3 system comprises one or more groups of N+1 disks, wherein N disks store data and the N+1th disk stores parity information. During a write action in a RAID 3 arrangement, each block of data is divided into N portions for storage among the N data disks. The corresponding parity information is written to a dedicated parity disk. In a RAID 5 system, one or more groups of N+1 disks are employed, and N disks used to store data and the N+1th disk stores parity information (similar to RAID 3). In the RAID 5 system, however, the data to be saved is divided into larger portions, consisting of one or more blocks of data, for storage among the disks. The parity information, instead of being resident on a single disk as in RAID 3, is distributed across the N+1 disks. Write actions require access to two disks, i.e., one of the N data disks and the parity disk. A read operation typically needs only to access a single one of the N data disks.

The prior art, in implementing RAID-configured disk arrays, has employed array controllers to organize the disk drives into the RAID configuration and to control the interaction between the individual disk drives. Array controllers have historically performed a cumulative exclusive-or (XOR) operation to generate the parity data and to accomplish its rewrite to the parity spaces on the individual disk drives. The prior art has also performed the XOR operation in the disk drive modules, themselves.

Performing the XOR operation in the disk drive module may result in a reduced number of data transfers across the interconnecting communication network. When an XOR operation is performed by an array controller, four data transfer operations are needed for a typical update write sequence, and the array controller further executes two internal XOR operations during the sequence. If the array controller is used in a supervisory mode (with the disk drive modules performing the XOR operations), only three data transfer operations are needed between the array controller and the individual disk drives, i.e., a write transfer to the disk drive containing the protected data; a read transfer from the disk drive containing protected data and a write transfer to the device containing parity data. By performance of the XOR operation in a disk drive module, the need is eliminated for the array controller to perform any XOR operations.

Nevertheless, substantial complexity is still required in the array controller to enable performance and control of the aforementioned three data transfer operations. Further, such array controllers are not easily scaled over a wide range of array sizes and number of arrays. While array controller-supervised XOR operations eliminate the need for special array hardware in the host computer, or in an array controller, the remaining array control functions and array management remain in the array controller.

Accordingly, it is an object of this invention implement a disk drive array wherein control functions are distributed among disk drives that comprise the array.

It is another object of this invention to provide a disk drive array that is configured to perform RAID functions, wherein the RAID control actions are performed at the disk drive level.

SUMMARY OF THE INVENTION

A data processing system incorporating the invention hereof, includes a host processor or server, connected to an array of disk drives which are further interconnected via a network. Each disk drive is logically divided into plural memory segments and, in the preferred embodiment, corresponding memory segments in each disk drive are arranged as a parity set in a RAID fashion. The host processor includes a driver which generates read and write commands to the array of disk drives. The commands include addresses which are in accord with ranges of addresses assigned to logical segments of memory in each disk drive. Each disk drive stores an array configuration page which includes data that identifies a logical memory segment size; a first index identifier for the disk drive that incorporates the respective memory segment; and a second index identifier for the last disk drive which stores parity for the parity set including the memory segment. Each disk drive includes a controller for determining from the logical segment size and the second index identifier, which logical memory segment in the respective memory stores parity data and also determines for data stored on a logical segment of a drive, which of the other drives contains the corresponding parity segment. The controller responds to an address accompanying a read or write command by mapping the address to a logical memory segment, other than the logical memory segment in the respective memory which stores parity data. Further, the controller, upon performing a write action to a logical segment, communicates directly with the disk drive that stores parity for the parity set of which the logical segment is a part and causes an update of that parity segment in accordance with the write action.

BRIEF DESCRIPTION OF THE DRAWINGS

FIG. 1 is a high level block diagram of a prior art disk drive array wherein array control is principally performed by a host processor (i.e., a "server").

FIG. 2 is a high level block diagram of a disk drive array incorporating the invention, wherein array control is distributed among the individual disk drives, with the host processor retaining array configuration control functionality.

FIGS. 3a and 3b illustrate data flow during the operation of the system of FIG. 2.

FIGS. 4a and 4b illustrate an exemplary disk array, utilizing RAID 5 parity.

FIG. 6 illustrates both physical and logical data segmentation on a 5 disk drive disk array that employs the invention hereof.

DETAILED DESCRIPTION OF THE INVENTION

Figure 5:
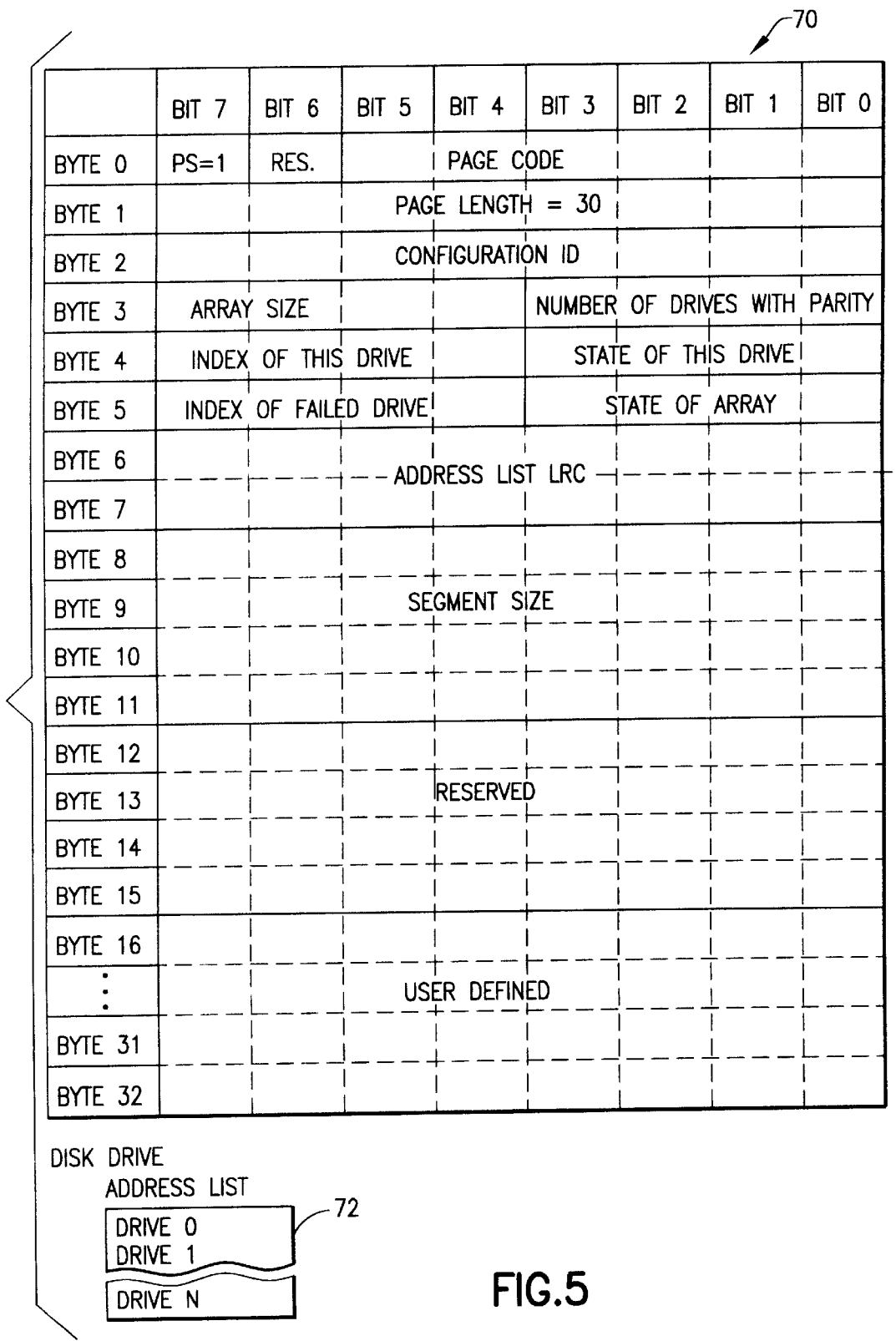
FIG. 5 illustrates an array configuration page and an address list which is derived by the host processor and is stored in the controller of each disk drive included in the disk drive array.

FIG. 1 illustrates a prior art data processing system comprising a host processor 10 and a disk array 12. Host processor 10 performs a server function wherein an array control module 14 therein enables RAID 5 organization of disk array 12. Host processor 10 further includes a device driver module 16 which issues, via an interface adapter 18, read and write commands to the disk drives within disk array 12. Interface adapter 18 provides interface control between host processor 10 and disk array 12.

Within disk array 12 are a plurality of disk drives 20, 22, 24, 26 and 28. Each of the disk drives is associated with a resident controller, e.g., 30, which performs the read/write and mechanical device control functions that are well known for disk drive controllers.

In the system shown in FIG. 1, the RAID functions of disk array 12 are controlled by array control module 14 and, as indicated above in the Background section hereof, require plural data transfers between host processor 10 and disk array 12 to accomplish the necessary RAID configuration and parity update actions.

FIG. 2 illustrates the system of FIG. 1, modified to include the invention hereof, with like numbering being utilized for substantially unchanged portions of the system. The functions previously performed by array control module 14 have been removed from host processor 10 and are now distributed among controllers 40, 42, 44, 46 and 48 in disk array 12. Within host processor 10 is an array configuration program 50 which transmits configuration information regarding disk array 12 (in the form of an array configuration page) to each of disk drive controllers 40–48. The array configuration page includes a "configuration ID" value and the same ID value is transmitted to device driver 16. As will be hereafter understood, the configuration ID value enables host processor 10 to always know that a disk drive controller being accessed understands the configuration of disk array 12 in the same manner as it is defined within host processor 10.

If a disk drive fails, array configuration program 50 institutes a new configuration and notifies device driver 16 of the address of a surrogate disk drive which is to execute commands on behalf of the failed disk drive. When a disk drive has been repaired, array configuration program 50 institutes a new configuration and notifies the device driver 16 to cease operating with the surrogate and institutes reconstruction of data on the repaired drive. Each time the array configuration is changed, a new configuration ID is assigned, device driver is notified of the new ID value, and a new array configuration page is transmitted to the respective disk drive controllers in disk array 12.

Each of disk drive controllers 40–48 includes an array control function which is operative to enable distributed management of the RAID structure of disk array 12. Each of controllers 40–48 includes a current array configuration page which includes sufficient information for the respective controller to determine the state of its associated disk drive; the state of disk array 12; the locations of data and parity blocks; the address of the disk drive which contains parity corresponding to data being written; and the addresses of disk drives to be used for regeneration, after a failure. Further, each controller includes a disk drive address list which enables peer-to-peer communication among the disk drives, using the configuration information stored in each drive controller.

Each of the disk drives in disk array 12 is interconnected via a bus system 52 which, in the preferred embodiment, is configured in accordance with a serial interface standard, such as the proposed SSA standard (Serial Storage Architecture), using the SCSI command set (Small Computer System Interface). In essence, the serial interconnection scheme enables any one disk drive to communicate with any other disk drive, as well as to host processor 10. As will be hereafter understood, this interconnection feature enables control of the array functions of disk array 12 by the individual disk drives, with the need to involve host processor 10 only on an exception basis.

Each of disk drives 20–28 appears to host processor 10 as a normal SCSI drive and data therein is addressed within a continuous range of logical block addresses. As will hereafter be understood, parity segments resident on disk drives 20–28 are not visible to host processor 10 and the capacity seen by host processor 10 is each disk drive's capacity, excluding the parity segment. Each of disk drives 20–28 executes parity update functions, independent of host processor 10, using the configuration information in the array configuration page stored in each of controllers 40–48.

As shown in FIGS. 3a and 3b, a read or write action is directed from device driver 16 in host processor 10 to a disk drive. Assuming that a write action occurs, data is transferred from host processor 10 to a respective disk drive (e.g., 20). Thereafter, assuming that parity segment for the parity set which contains the memory segment into which the data was just written, is maintained on disk drive 28, a parity update occurs by transfer of commands and data directly from disk drive 20 to disk drive 28, without the involvement of host processor 10. Details of this operation will be understand from the examples given below; however, it is to be understood that the distribution of the disk array control functions among the respective disk drives enables a wide variation in the number of disk drives in the array configuration, as well as eliminating the need to alter the hardware of host processor 10 whenever the array size is altered.

FIGS. 4a and 4b illustrate a RAID 5 arrangement of parity and logical data segments across disk drives 20, 22, 24, 26 and 28. Each disk drive is, in this example, divided into five logical memory segments (i.e., A–E). Each logical memory segment is of identical size and logical memory segments assigned the same letter identifier form a portion of a parity set. For example, logical segment 60 in disk drive 20 contains the parity data for logical memory segments 62, 64, 66 and 68. Other parity segments are distributed among the various disk drives to prevent any one disk drive from being overloaded by parity update actions (in the known manner of a RAID-5 organization).

While the example shown in FIGS. 4a and 4b involves five disk drives and each disk drive is divided into five logical memory segments, it is to be understood that these values are used merely for explanation and that those skilled in the art will understand that the values are subject to a wide variation, in accordance with the anticipated configuration of the system.

Each of disk drives 20, 22, 24, 26 and 28 includes a parity segment which, as described above, is invisible to host processor 10, unless explicitly addressed thereby. Otherwise, each of the disk drives is addressed by host processor 10 as a standard disk drive, without consideration of its placement or arrangement in disk array 12.

As shown in FIG. 4b, disk drive 22 is divided into 5 segments 0–4, with segment 1 being employed for parity. The physical addresses in each of the respective segments are as shown within each segment. The logical memory addresses are shown to the left of disk drive 22. Note that segment 0 has logical addresses 000–999 and that the address values then jump the parity space segment and sequentially increase in segment 2 from 1000–1999, etc.

It is to be understood with respect to FIGS. 4a and 4b, that the data that is present in each parity set A, B . . . , E may be either totally independent and non-related or may be associated. In the preferred embodiment, the data in each disk drive is logically segmented on the disk drive as though the disk drive is an individual disk drive and has no relationship to the other disk drives in the array—which is a different configuration from that normally found in a RAID 5 structure. RAID 5 structures normally segment the data in a striping fashion across the disk drives, with the parity segment associated with the associated, striped data.

Organizing data on each of disk drives 20–28, as though each disk drive is independent, enables host processor 10 to address each individual disk drive as though it is independent of array 12, leaving the parity update and data reconstruction functions to the array control modules within each of disk drive controllers 40–44.

As above indicated, array configuration program 50 provides an array configuration page and a disk drive address list to each of disk controllers 40, 42, 44, 46 and 48. In FIG. 5, an array configuration page 70 and a disk drive address list 72 are shown, schematically. Disk drive address list 72 is an ordered list of the disk drives in disk array 12. In a preferred embodiment, the address list includes a unique identifier for each disk drive, as well as definitions of primary and secondary transmission and receive paths. Drive address list 72 includes all information necessary for communication on a peer-to-peer basis between the disk drives within disk array 12. The contents of each disk drive address list 72 are different for each drive in disk array 12 and are constructed by array configuration program 50 in host processor 10.

Array configuration page 70 is the basic data file which enables array control among the disk drives in disk array 12. Certain byte positions within array configuration page 70 are not directly relevant to this invention and will not be described (e.g. bytes 0, 1 and 12–32). Byte 2 includes the configuration ID which, as explained above, is used to verify that host processor 10 and the respective disk drive controller both understand the same configuration of disk array 12. Byte 3, bits 7–4 define the array size, which is the number of disk drives in the array. This value defines the last valid drive address in the address list. Byte 3, bits 3–0 define the number of drives with parity or the address of the last drive containing parity in disk drive address list 72. All disk drives prior to that point in disk drive address list 72 contain parity segments and all disk drives beyond that point contain only data segments. It will be recalled that RAID 5 requires that the logical parity segments be distributed among the disk drives to avoid overloading any one particular disk drive with parity update action. There may, however, be disk drives which are not organized in a RAID 5 arrangement and those drives appear after the value in byte 3, bits 3–0. As will be further understood, this value, in combination with the number of logical segments in a disk drive enable each disk drive to calculate the position of a logical memory segment devoted to parity in any of the disk drives within disk drive array 12.

Byte 4, bits 7–4 indicate the index of the drive in which this particular array configuration page 70 is stored. In other words, the index value in byte 4, bits 7–4, is a pointer to disk drive address list 72 which indicates the actual address of the respective disk drive.

Byte 4, bits 3–0 indicate the state of the particular disk drive. The state may be operational; failed; rebuilding drive; or rebuilding parity segments. Byte 5, bits 7–4 indicate the index of a failed drive and is a pointer to disk drive address list 72 wherein the actual address of the failed drive resides.

Byte 5, bits 3–0 indicate the array state and may be as follows: intact; single failed drive (failed drive pointer valid); regeneration not allowed (multiple failed drives); Regeneration not allowed (parity not valid); or reconstruction in progress.

Bytes 6–7 are longitudinal redundancy check bits used to verify that the address list and array configuration page data are consistent. Bytes 8–11 define the segment size (i.e., the number of sectors in a logical memory segment). The value is the same for all segments on all drives.

Referring now to FIG. 6, address values are illustrated for each of five disk drives that are arrayed in a RAID 5 configuration and will be considered in the examples given below. Note that in each of disk drives 0–4, the data segments form a contiguous address space, and the parity segment form a distinct contiguous address space. A command is directed to a logical address for data or parity, as appropriate, and the logical address is translated by the drive controller into the corresponding physical address. As can be seen from FIG. 6, parity segment 100 serves as the parity for data segments 102, 104, 106, and 108 in parity set A. Similarly, parity segment 110 serves as the parity segment for parity set B, etc.

Figure 7A:
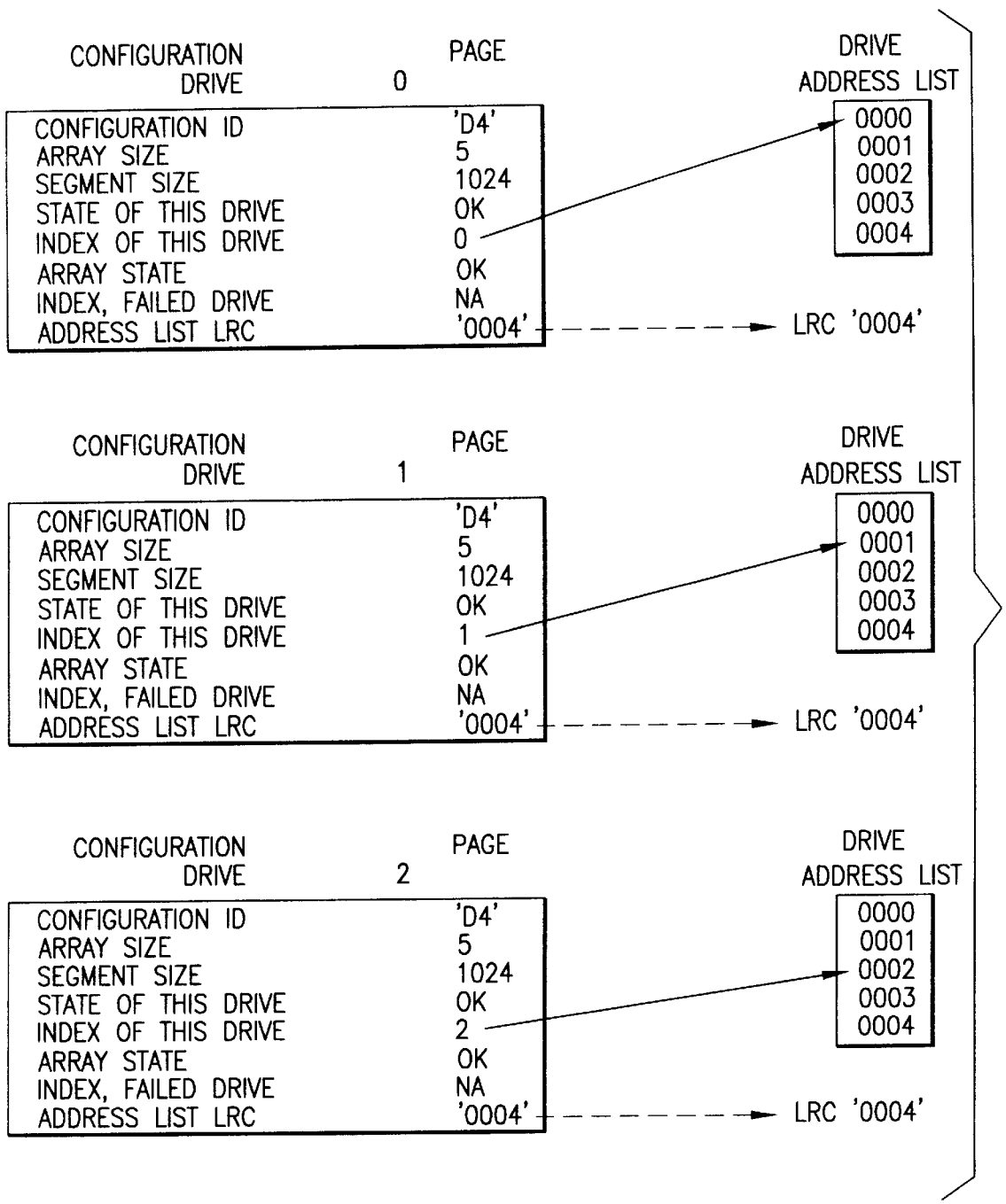
FIG. 7A and FIG. 7B illustrate data contained in each array configuration page and each disk drive in the array, when the array is intact.
Figure 7B:
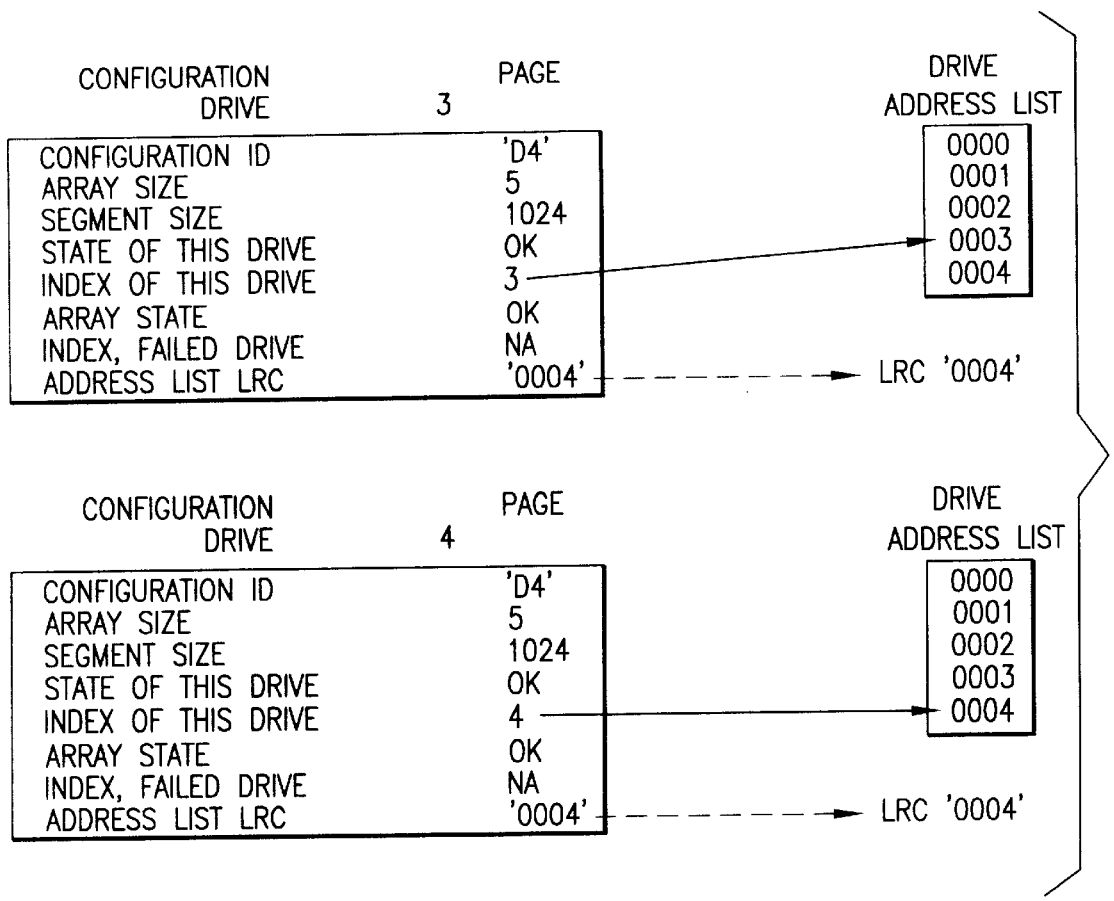

Turning to FIG. 7, array configuration pages are shown for each of drives 0–4, assuming that all disk drives in array 12 are operational. Note that the "index of this drive" entry is a pointer to the associated drive address list which provides the actual drive address which includes the respective array configuration page. In this instance, all of the disk drives are operational so each of their array configuration pages are substantially identical, save the index of the respective drive.

Figure 8A:
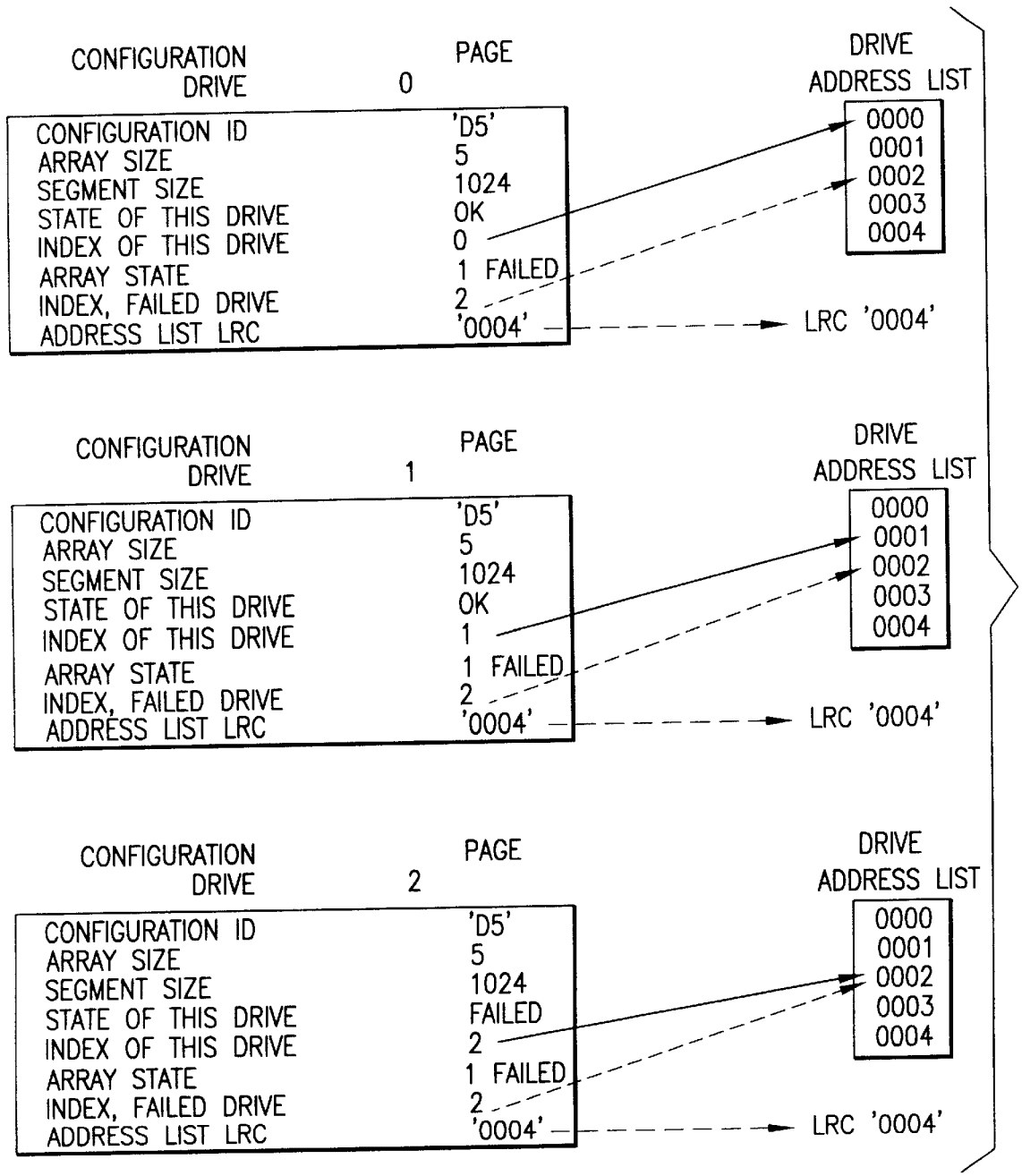
FIG. 8A and FIG. 8B illustrate the data contained in each array configuration page of each disk drive in the array, when a single drive has failed.
Figure 8B:
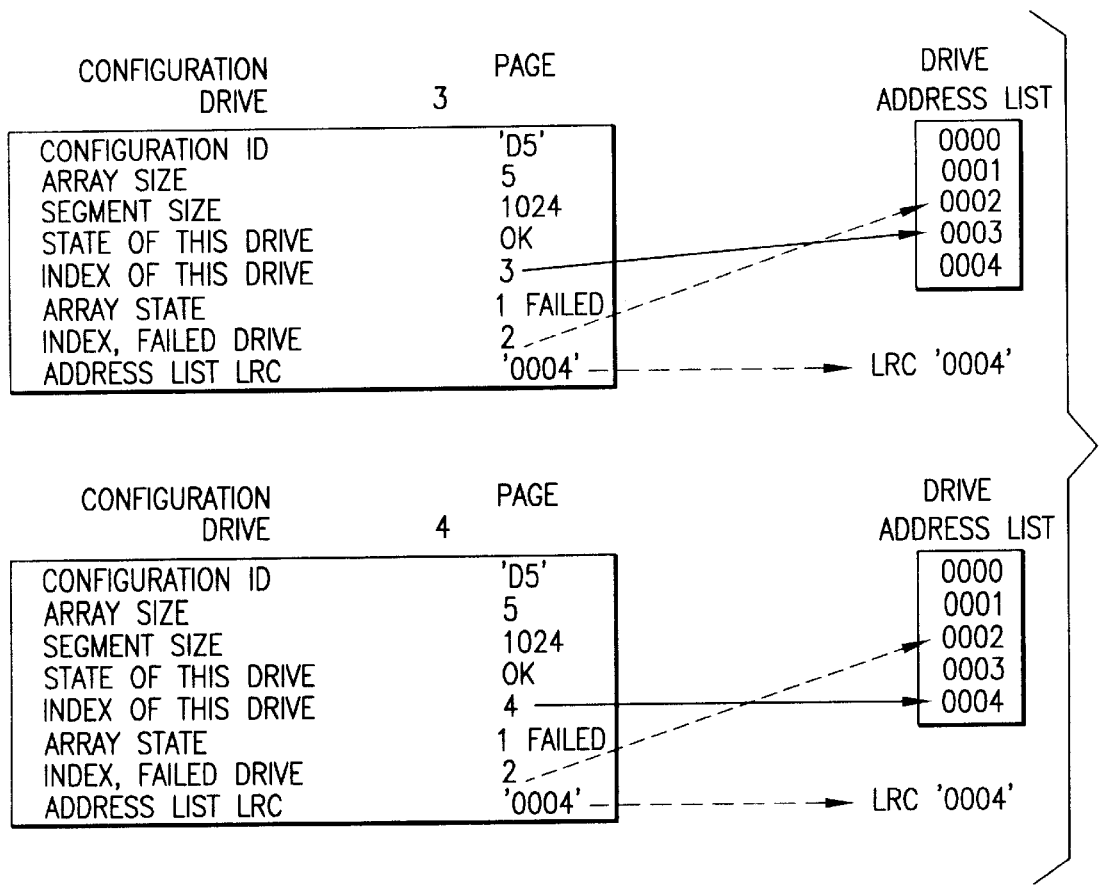

By contrast, as shown in FIG. 8, drive 2 is indicated as having failed. Thus the array configuration page for drive 2 indicates the failed state for that drive. Similarly, each of the remaining configuration pages indicates that the index of the failed drive is 2, thereby enabling each disk drive to know where a failure has occurred and to be able to translate to a surrogate drive, as if it were the failed drive. Upon the failure of a disk drive, array configuration module 50 in host processor 10 quiesces all drives of the array and sets a new array configuration page which indicates the index of a surrogate drive and further establishes a substitute disk drive address list. The data and parity information on the failed disk drive are reconstructed on the surrogate disk drive from the parity sets and data sets on the remaining drives.

Before proceeding to examples which further describe the invention, the procedures used to identify both physical addresses, from received logical addresses, and parity spaces on specific disk drives, using data in each disk drive's array configuration page, will be considered.

Array configuration module 50 in host processor 10 divides the memory space in each disk drive into multiple logical segments of equal size, the size of the segments being defined in Array Configuration Page 72. In the following, it is assumed that each disk drive has the physical capacity of 5120 bytes which have been divided into five segments of 1024 byte blocks (i.e., four data segments and one parity segment). Each disk drive includes an array configuration page and a disk drive address list.

A disk drive calculates the number of segments from the segment size value and the drive capacity, rounding down to the nearest integer. If there are M disk drives with parity segments, then one out of every M segments on each of the disk drives is a parity segment, and the remainder are available for data storage. All segments are available for data storage on expansion drives (i.e., drives not containing parity segments).

The "current" configuration information in array configuration module 50 is used to present a logical view to host processor 10 of which data segments constitute a single space of contiguous logical block addresses. Parity segments constitute a separate space of contiguous logical block addresses. The two address spaces are addressed as separate logical units.

Upon receiving an address from host processor 10, a disk drive performs an address translation and proceeds as follows. Given a segment size Z, the number of full segments N on a disk drive can be calculated. Given M drives with parity: The number of parity segments on a drive is $Np=N/M$, rounded up to an integer. The number of data segments on a drive is $NdD=N-Np$. This arrangement assures that each data segment on a drive can be associated in a parity set with a unique parity segment on one of the other drives.

A disk drive will respond to a "READ CAPACITY" command with a maximum logical block address of $Nd*Z-1$. An array configuration page 72 enables access to a drive address list 70. Parity distribution is defined algorithmically on the basis of position in drive address list 70 of the disk drive address and is transparent to host processor 10. The address of any drive can be changed, without affecting the validity of data and parity, by merely updating its address in the list.

In the preferred embodiment, parity sets are defined as corresponding physical blocks, and parity segments are processed with drive number, as shown in FIGS. 4 and 6. Where there are more segments on a drive than the number of drives with parity, the pattern is repeated until the number of segments is exhausted.

```
Let
    Z  = segment size (blocks)
    C  = M-1 for a drive containing parity,
         or M for a drive not containing parity
       = the length of the parity rotation pattern
```

Then the correspondence between data and parity blocks is described by the following three cases:

1) DATA UPDATE: given a data space logical block address (LBA) Ld on drive D, determine the corresponding parity drive (P) and parity space LBA (Lp).

```
Divide Ld by Z -->
    Quotient   = Q1 = data segment number
    Remainder  = R1
               = block offset withinthe data
                 segment
               = block offset within the
                 corresponding parity segment
Divide Q1 by C -->
    Quotient   = Q2
               = rotation number within the cycle of
                 data segments
               = parity segment number
    Remainder  = R2
               = data segment number within a
                 rotation
If R2 < D, then P = R2
Otherwise, P = R2 + 1
and
Lp = Q2*Z + R1
```

2) RECONSTRUCT DATA: Given a data space LBA (Ld) on drive D, determine the corresponding LBA's on the remaining drives from which the addressed block can be reconstructed.

2) RECONSTRUCT DATA: Given a data space LBA (Ld) on drive D, determine the corresponding LBA's on the remaining drives from which the addressed block can be reconstructed.

```
parity drive (P) and parity space LBA (Lp) are
derived as for data update.
data space LBA's (Ldi on data drives Di (other
than D and P)):
    If Di > P > D, then Ldi = Ld + Z
    If Di < P < D, then Ldi = Ld - Z
    Otherwise,        Ldi = Ld
```

3) RECONSTRUCT PARITY: Given parity space LBA (Lp) on drive P, determine the corresponding data space LBA's on the remaining drives, from which the addressed block can be reconstructed.

```
data space LBA's (Ldi on data drives, Di, other than
p)
    Divide Lp by Z -->
        Quotient   = Q2
                   = rotation number
        Remainder  = R1
                   = block offset within the parity
                     segment
                   = block offset within the
                     corresponding data segment
    If Di > P, then Lbi = Z*(P + Q2*C) + R1
    If Di < P, then Lbi = Z*((P - 1) + Q2*C) + R1
```

Figure 9:
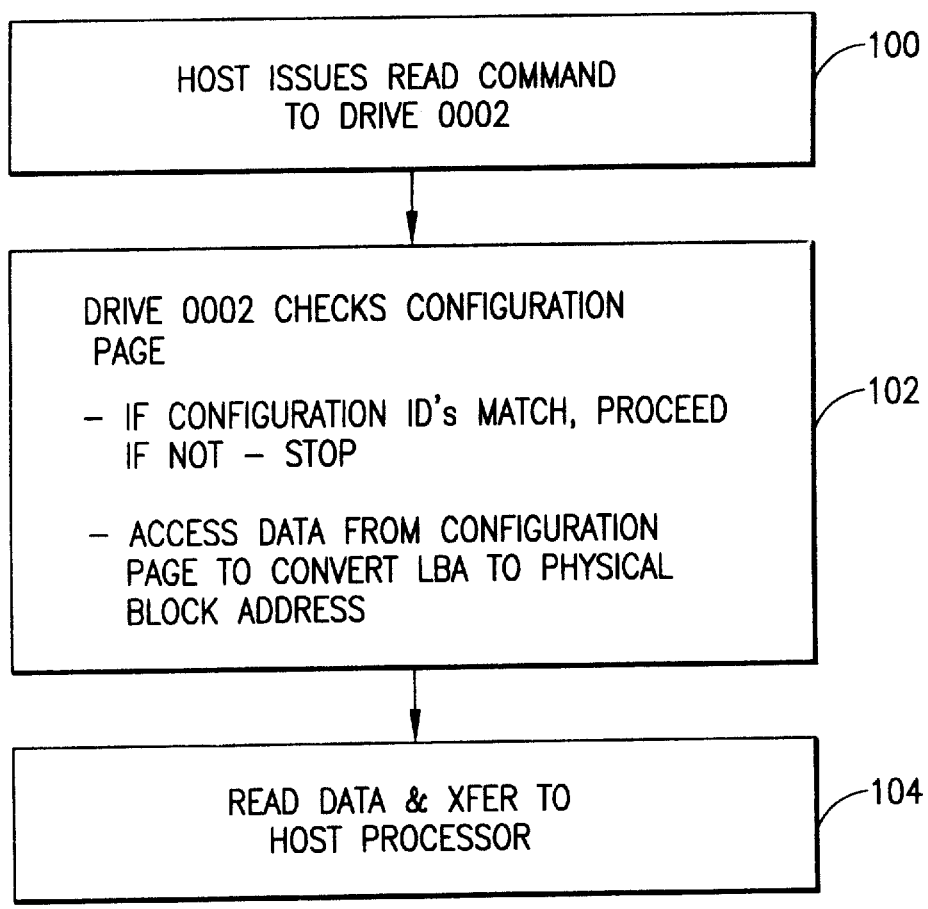
FIG. 9 is a high level logic flow diagram illustrating the operation of the invention during a Read action.
Figure 10:
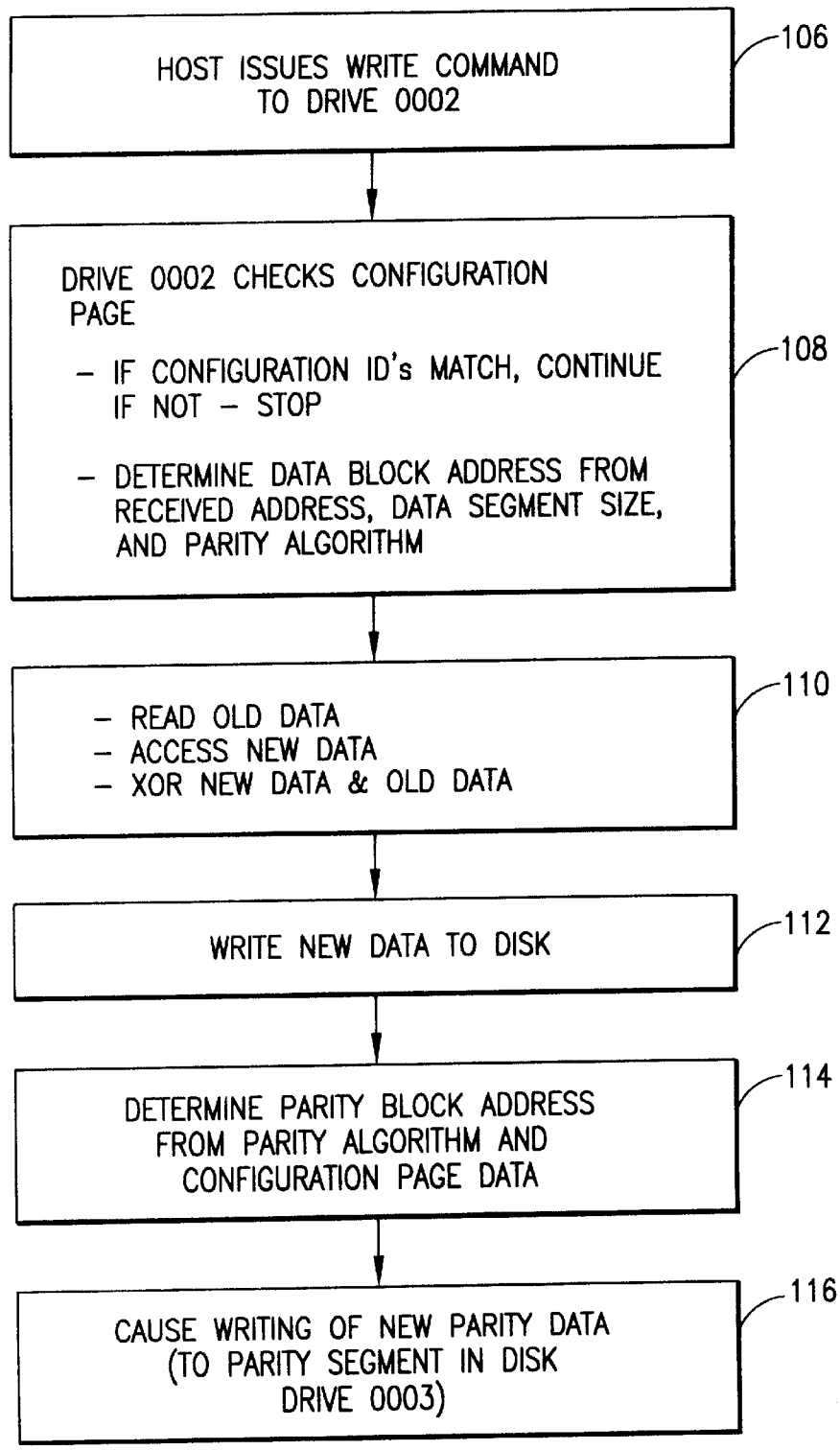
FIG. 10 is a high level logic flow diagram illustrating the operation of the invention during a Write action and a resulting parity update.

Hereafter, a set of examples are considered, in conjunction with FIGS. 9 and 10, which describe the operation of the invention (i) when all disks are intact and (ii) when one disk is inoperative.

In the following examples, the number of segments per drive is equal to the number of drives, providing a simple algorithm for parity distribution. For the examples:

Z=1024 blocks per segment
N=5 segments per drive
M=5 drives in the array, all with parity
Q2=0

---

1) Example update data on drive D:
    Divide Ld by 1024 --> Q1 and R1
    If Q1 < D then P = Q1
    Otherwise,    P = Q1 + 1
        and
    Lp = R1
2) Example reconstruct data on drive D:
    a) Divide Ld by 1024 --> Q1 and R1
        If Q1 < D then P = Q1
        Otherwise,    P = Q1 + 1
            and
        Lp = R1
    b) If Di > P > D, then Ldi = Ld + Z
        If Di < P < D, then Ldi = Ld - Z
        Otherwise,        Ldi = Ld
3) Example reconstruct parity on drive P:
    If Di > P, then Lbi = Z*P + Lp
    If Di < P, then Lbi = Z*(P - 1) + Lp

---

EXAMPLE 1

INTACT ARRAY

---

1.1 READ OPERATION, DISK DRIVE 0002, DATA BLOCKS 2054–2063 (See FIG. 9)

---

HOST TO DRIVE 0002:
    Issues READ command (box 100, FIG. 9)
        Configuration ID 'D4'
            Logical Block Address 2054 (Data
            Space), Transfer Length 9
DRIVE 0002:
    Refers to Configuration Page (box 102):
        Configuration ID: 'D4'
        Consistent with ID sent from Host
        -> Continue operation
        State of this drive: OK
        -> Continue operation
        Segment size: 1024
        -> Data block address is in Data Segment
            2, offset six blocks from segment
            boundary
        Index of this drive: 2
        -> Data Segment 2 is Physical Segment 3
            according to the parity distribution algorithm
    Calculates Physical Block Address
            3 x 1024 + 6 = 3078
    Reads blocks 3078–3087 (box 104)
    Transfers data to Host.

---

1.2 WRITE OPERATION, DISK DRIVE 0002, DATA BLOCKS 2054–2063 (FIG. 10)

---

HOST TO DRIVE 0002:
    Issues WRITE command (box 106, FIG. 10)
        Configuration ID: 'D4'
        Logical Block Address 2054 (Data Space)
        Transfer Length 9
Drive 0002:
    Refers to Configuration Page (box 108):
        Configuration ID: 'D4'
        Consistent with ID sent from Host
        -> Continue operation
        State of this drive: OK
        -> Continue operation
        Segment size: 1024
        -> Data block address is in Data Segment
            2, offset six blocks from segment
            boundary
        Index of this drive: 2
        -> Data Segment 2 is Physical Segment 3
            according to the parity distribution
            algorithm
    Calculates Physical Block Address
            3 x 1024 + 6 = 3078
    Reads blocks 3078–3087 (Old_Data) (box 110)
    Transfers data from Host (New_Data)
    Exclusive-Or's Old_Data and New_Data
            (Parity_Update)
    Writes New Data to blocks 3078 to 3087 (box 112)
    Determines Parity Block Address from parity
    algorithm (box 114)
        Data Segment 2 -> Parity Segment 0
        Offset 6 -> Parity Block 0006. (Note: a
            drive may have multiple Parity Segments)
        Determines Parity Drive Index from
            parity distribution algorithm
            Data Segment 2, Data Drive Index 2
            -> Parity Drive Index 3
        Refers to Drive Address table
        Drive Index 3 -> Drive Address 0003
DRIVE 0002 TO DRIVE 0003: (box 116)
    Issues XPWRITE ("parity write") command
        Configuration ID 'D4'
        Logical Block Address 0006 (Parity Space)
        Transfer Length 9
DRIVE 0003:
    Refers to Configuration Page:
        Configuration ID: 'D4'
        Consistent with ID sent from Host
        -> Continue operation
        State of this drive: OK
        -> Continue operation
        Segment size: 1024
        -> Parity Block address in Parity Segment
            0 offset, six blocks from segment
            boundary
        Index of this drive: 3
        -> Parity Segment 0 is Physical Segment 3
            according to the parity distribution
            algorithm
    Calculates Physical Block Address
            3 x 1024 + 6 = 3078
    Reads blocks 3078–3087 (Old_Parity)
    Transfers data frorn Drive 0002
            (Parity_Update)
    Exclusive-Or's Old_Parity and Parity_Update
            (New Parity)
    Writes New Parity to blocks 3078 to 3087
    Reports Operation Complete to Drive 0002
DRIVE 0002:
    Reports Operation Complete to Host

---

EXAMPLE 2

DRIVE 0002 FAILED

---

2.1 READ OPERATION, DISK DRIVE 0002, DATA BLOCKS 2054–2063, DRIVE 0001 AS SURROGATE

---

HOST TO DRIVE 0001:
    - Issues READ command
        Configuration ID: 'D5'
        Logical Block Address 2054 (Surrogate Data
        Space)
        Transfer Length 9
DRIVE 0001:
    - Refers to Configuration Page:
        Configuration ID: 'D5'
        Consistent with ID sent from Host
        -> Continue operation

```
        State of this drive: OK
        ->Continue operation
        Segment size: 1024
        -> Data block address is in Data Segment
           2, offset six blocks from segment
           boundary
        State of array: one failure
        -> regeneration allowed
        -> continue surrogate operation
        Index of failed drive: 2
        -> Data Segment 2 is Physical Segment 3
           according to the parity distribution
           algorithm
        Array Size: 5
        -> Must regenerate data using data from
           drives at Indices 0, 1, 3 and 4;
           Physical Segment 3, offset six blocks
        Index of this Drive: 1
        -> Must read data from this drive; and
           issue READ commands to drives at
           Indices 0, 3 and 4
     - For Drive Index 0
        Refers to Drive Address List
        -> Drive address = 0000
        Parity distribution algorithm, Drive Index 0
        -> Physical Segment 3 is Data Segment 2
        Logical Block Address for READ command is
           2 × 1024 + 6 = 2054
     - For Drive Index 1 (this drive)
        Physical Segment 3 Physical Block Address is
           3 × 1024 + 6 = 3078
        Reads blocks 3078–3087 (Regen Data 1)
     - For Drive Index 3
        Refers to Drive Address List
        -> Drive address = 0003
        Parity distributjon algorithm, Drive Index 3
        -> Physical Segment 3 is Parity Segment 0
        Logical Block Address for READ command is
           0 × 1024 + 6 = 0006
     - For Drive Index 4
        Refers to Drive Address List
        -> Drive address = 0004
        Parity distribution algorithm, Drive Index 4
        -> Physical Segment 3 is Data Segment 3
        Logical Block Address for READ command is
           3 × 1024 + 6 = 3078
     Drive 0001 to Drive 0000:
        - Issues READ command
           Configuration ID: 'D5'
           Logical Block Address 2054 (Data Space)
           Transfer Length 9
     Drive 0000:
        - Refers to Configuration Page:
           Configuration ID: 'D5'
           Consistent with ID sent from Drive 0001
           -> Continue operation
           State of this drive: OK
           -> Continue operation
           Segment size: 1024
           -> Data block address is in Data Segment
              2, offset six blocks from segment
              boundary
           Index of this drive: 0
           -> Data Segment 2 is Physical Segment 3
              according to the parity distribution
              algorithm
        - Calculate Physical Block Address
              3 × 1024 + 6 = 3078
        - Reads blocks 3078–3087
        - Transfers data to Drive 0001
              (Regen_Data_0)
     DRIVE 0001 TO DRIVE 0003:
        - Issues READ command
           Configuration ID 'D5'
           Logical Block Address 0006 (Parity Space)
           Transfer Length 9
     DRIVE 0003:
        - Refers to Configuration Page:
           Configuration ID: 'D5'
           Consistent with ID sent from Drive 0001
           -> Continue operation
           State of this drive: OK
           -> Continue operation
           Segment size: 1024
           -> Parity Block address in Parity Segment
              0, offset six blocks from segment
              boundary
           Index of this drive: 3
           -> Parity Segment 0 is Physical Segment 3
              according to the parity distribution
              algorithm
        - Calculates Physical Block Address
              3 × 1024 + 6 = 3078
        - Reads blocks 3078–3087
        - Transfers data to Drive 0001 (Regen_Data_3)
     DRIVE 0001 TO DRIVE 0004:
        - Issues READ command
           Configuration ID 'D5'
           Logical Block Address 3078 (Data Space)
           Transfer Length 9
     DRIVE 0004:
        - Refers to Configuration Page:
           Configuration ID: 'D5'
           Consistent with ID sent from Host
           -> Continue operation
           State of this drive: OK
           -> Continue operation
           Segment size: 1024
           -> Data Block address is in Data Segment
              3, offset six blocks from segment
              boundary.
           Index of this drive: 4
           -> Data Segment 3 is Physical Segment 3
              according to the parity distribution
              algorithm
        - Calculates Physical Block Address
              3 × 1024 + 6 = 3078
        - Reads blocks 3078–3087
        - Transfers data to Drive 0001 (Regen_Data_4)
     DRIVE 0001:
        - Exclusive-Or's Regen_Data_0,
           Regen_Data_1, Regen_Data_3, and
           Regen_Data_4 (Reconstructed_Data)
        - Transfers Reconstructed_Data to Host 2.2 WRITE OPERATION, DISK DRIVE 0002, DATA BLOCKS
2054–2063, DRIVE 0001 AS SURROGATE HOST TO DRIVE 0001 (SURROGATE DATA SPACE)
        - Issues WRITE command
           Configuration ID 'D5'
           Logical Block Address 2054
           Transfer Length 9
     DRIVE 0001:
        - Refers to Configuration Page:
           Configuration ID: 'D5'
           Consistent with ID sent from Host
           -> Continue operation
           State of this drive: OK
           -> Continue operation
           Segment size: 1024
           -> Data block address is in Data Segment
              2, offset six blocks from segment
              boundary
           State of array: one failure
           -> regeneration allowed
           -> continue surrogate operation
           Index of failed drive: 2
           -> Data Segment 2 is Physical Segment 3
              according to the parity distribution
              algorithm
           -> Data Segment 2, Data Drive Index 2
              corresponds to Parity Drive Index 3
              according to the parity distribution
              algorithm
           Array Size: 5
           -> Must regenerate (Old Parity + Old
              Data) using data from drives at
              Indices 0, 1 and 4;
              Physical Segment 3, offset six blocks;
```

```
            Update Parity with New Data: and
               Writes to Drive at Index 3.
            Index of this Drive: 1
            -> Must read data from this drive; and
               issue READ commands to drives at
               Indices 0 and 4
   - For Drive Index 0
         Refers to Drive Address List
         -> Drive address = 0000
         Parity distribution algorithm, Drive
         Index 0
            Physical Segment 3 is Data Segment 2
            Logical Block Address for READ command is
               2 × 1024 + 6 = 2054
   - For Drive Index 1 (this drive)
         Physical Segment 3 Physical Block Address is
            3 × 1024 + 6 = 3078
         Reads blocks 3078-3087 (Regen_Data_1)
   - For Drive Index 4
         Refer to Drive Address List
         -> Drive address = 0004
         Parity distribution algorithm, Drive Index 4
         -> Physical Segment 3 is Data Segment 3
         Logical Block Address for READ command is
            3 × 1024 + 6 = 3078
   Drive 0001 to Drive 0000:
      - Issues READ command
            Configuration ID 'DS'
            Logical Block Address 2054 (Data Space)
            Transfer Length 9
   Drive 0000:
      - Refers to Configuration Page:
            Configuration ID: 'D5'
            Consistent with ID sent from Drive 0001
            -> Continue operation
            State of this drive: OK
            -> Continue operation
            Segrnent size: 1024
            -> Data block address is in Data Segment
               2, offset six blocks from segment
               boundary
            Index of this drive: 0
            -> Data Segment 2 is Physical Segment 3
               according to the parity distribution
               algorithm
         - Calculates Physical Block Address
               3 × 1024 + 6 = 3078
         - Reads blocks 3078-3087
         - Transfers data to Drive 0001 (Regen_Data_0)
   DRIVE 0001 TO DRIVE 0004:
      - Issues READ command
            Configuration ID: 'D5'
            Logical Block Address 3078 (Data Space)
            Transfer Length 9
   DRIVE 0004:
      - Refers to Configuration Page:
            Configuration ID: 'D5'
            Consistent with ID sent from Host
            -> Continue operation
            State of this drive: OK
            -> Continue operation
            Segment size: 1024
            -> Data Block address is in Data Segment
               3, offset six blocks from segment
               boundary
            Index of this drive: 4
            -> Data Segment 3 is Physical Segment 3
               according to the parity distributian
               algorithm
         - Calculates Physical Block Address
               3 × 1024 + 6 = 3078
         - Reads blocks 3078-3087
         - Transfers data to Drive 0001
               (Regen_Data_4)
   DRIVE 0001:
      - Transfers Data from Host (New_Data)
      - Exclusive-Or's New_Data, Regen_Data_0,
         Regen_Data_1, and Regen_Data_4
         (Updated_Parity)
      - For Parity Drive, Index 3
            Refers to Drive Address List
            -> Drive address = 0003
            Parity distributidn algorithm, Drive
            Index 3
            -> Physical Segment 3 is Parity
               Segment 0
            Logical Block Address is
               0 × 1024 + 6 = 0006
      DRIVE 0001 TO DRIVE 0003:
         - Issues WRITE command
               Configuration ID 'D5'
               Logical Block Address 0006 (Parity Space)
               Transfer Length 9
      DRIVE 0003:
         - Refers to Configuration Page:
               Configuration ID: 'D5'
               Consistent with ID sent from Drive 0001
               -> Continue operation
               State of this drive: OK
               -> Continue operation
               Segment size: 1024
               -> Parity Block address in Parity Segment
                  0 offset six blocks from segment
                  boundary
               Index of this drive: 3
               -> Parity Segment 0 is Physical Segment 3
                  according to the parity distribution
                  algorithm
            - Calculates Physical Block Address
                  3 × 1024 + 6 = 3078
            - Transfers data from drive 0001
                  (Updated_Parity)
            - Writes blocks 3078-3087
            - Reports Operation Complete to Drive 0001
      Drive 0001:
         - Reports operation complete to Host
```

It should be understood that the foregoing description is only illustrative of the invention. Various alternatives and modifications can be devised by those skilled in the art without departing from the invention. For instance, the procedures described above can be operated by a data processing system in accordance program data and instructions read from a magnetic disk or other recording media. Accordingly, the present invention is intended to embrace all such alternatives, modifications and variances which fall within the scope of the appended claims.

I claim:

1. A data processing system including a host processor and an array of storage devices coupled to each other and the host processor via communication means, each storage device logically divided into N logical memory segments, where N is an integer greater than 1, and corresponding ones of said logical memory segments (i.e., a "parity set") across P storage devices including at least one logical memory segment which stores parity for P-1 logical memory segments of said parity set, said data processing system comprising:

driver means in said host processor for generating read and write commands to said array of storage device, said commands including addresses which are in accord with ranges of addresses assigned to logical memory segments in each storage device;

memory means in each said storage device for storing array configuration data which includes data identifying: a logical memory segment size; a first identifier for the storage device incorporating the respective memory means; and a second identifier for a last storage device which stores parity;

control means in each said storage device for determining from said logical memory segment size and said second identifier which logical memory segment in said respective memory means stores parity data, and for responding to an address accompanying a read or write command by mapping said address to a logical memory segment other than said logical memory segment in said respective memory means which stores parity data, said control means, upon performing a write action to a logical memory segment in said parity set, communicating directly with the storage device that stores parity for the logical memory segment that was subject to the write action and causing an update of said parity in accordance with said write action.

2. The data processing system as recited in claim 1, wherein said control means determines the storage device which stores parity for said parity set from data in said array configuration page stored therewith.

3.. The data processing system as recited in claim 1, wherein said array configuration data in each storage device enables each associated control means to calculate a corresponding address in a logical memory segment in an associated one of said P-1 logical memory segments.

4. The data processing system as recited in claim 1, wherein said array configuration data further includes a third entry which identifies one of said P storage device as evidencing a failed operational state, said control means upon receiving a read command for data in a logical memory segment, issuing read commands to other storage device evidencing an operational state, to read data at corresponding logical memory segment locations, and, upon receiving such data, regenerating data previously available from said storage device evidencing a failed operational state.

5. The data processing system as recited in claim 1, wherein said one logical memory segment which stores parity for P-1 logical memory segments of said parity set is invariably stored in an initial range of physical addresses of a storage device.

6. The data processing system as recited in claim 1, wherein said driver means accompanies each write command with a configuration identifier and each array configuration data set also includes a configuration identifier, said control means executing said write command only if each configuration identifier is the same.

7. A method for controlling an array of intercoupled disk drives in a data processing system which includes a host processor, each disk drive logically divided into N logical memory segments, where N is an integer greater than 1, and corresponding ones of said logical memory segments (i.e., a "Parity set") across P storage device include at least one logical memory segment which stores parity for P-1 logical memory segments of said parity set, said method comprising the steps of:

causing said host processor to generate read and write commands to said array of disk drives, said commands including addresses which are in accord with ranges of addresses assigned to logical memory segments in each disk drive;

storing in memory in each said disk drive an array configuration page which includes data identifying: a logical memory segment size; a first identifier for the disk drive incorporating the respective memory; and a second identifier for a last disk drive which stores parity;

operating a control means in each said disk drive to determine from said logical memory segment size and said second identifier which logical memory segment in said respective memory stores parity data, and for responding to an address accompanying a read or write command by mapping said address to a logical memory segment other than said logical memory segment in said respective memory which stores parity data, and further causing said control means, upon performing a write action to a logical memory segment in said parity set, to communicate directly with the disk drive that stores parity for the logical memory segment that was subject to the write action and to further cause an update of said parity in accordance with said write action.

8. The method as recited in claim 7, wherein said operating step causes said control means to determine the disk drive which stores parity for said parity set from data in said array configuration page stored therewith.

9. The method as recited in claim 7, wherein said array configuration page data in each disk drive enables each associated control means to calculate a corresponding address in a logical memory segment in an associated one of said P-1 logical memory segments.

10. The method as recited in claim 7, wherein said array configuration page further includes a third entry which identifies one of said P storage device as evidencing a failed operational state, and said operating step further causes said control means, upon receiving a read command for data in a logical memory segment, to issue read commands to other disk drives evidencing an operational state, to read data at corresponding logical memory segment locations, and, upon receiving such data, regenerating data previously available from said disk drive evidencing a failed operational state.

11. The method as recited in claim 7, wherein each write command includes a configuration identifier and each array configuration page also includes a configuration identifier, said operating step causing said control means to execute said write command only if each configuration identifier is the same.

12. A memory media for operation in conjunction with computation means for controlling an array of intercoupled disk drives in a data processing system which includes a host processor, each disk drive logically divided into N logical memory segments, where N is an integer greater than 1, and corresponding ones of said logical memory segments (i.e., a "parity set") across P storage device include at least one logical memory segment which stores parity for P-1 logical memory segments of said parity set, said memory media comprising:

first means for operation with said computation means for causing said host processor to generate read and write commands to said array of disk drives, said commands including addresses which are in accord with ranges of addresses assigned to logical memory segments in each disk drive;

second means for operation with said computation means for causing storage in memory in each said disk drive of an array configuration data which includes data identifying: a logical memory segment size; a first identifier for the disk drive incorporating the respective memory; and a second identifier for a last disk drive which stores parity;

third means for operating a control means in each said disk drive to determine from said logical memory segment size and said second identifier which logical memory segment in said respective memory stores parity data, and for responding to an address accompanying a read or write command by mapping said address to a logical memory segment other than said logical memory segment in said respective memory which stores parity data, said third means further causing said control means, upon performing a write action to a logical memory segment in said parity set, to communicate directly with the disk drive that stores parity for the logical memory segment that was subject to the write action and to further cause an update of said parity in accordance with said write action.

13. The memory media as recited in claim 12, wherein said third means causes said control means to determine the disk drive which stores parity for said parity set from data in said array configuration data stored therewith.

14. The memory media as recited in claim 12, wherein said array configuration data in each disk drive enables said third means to operate each associated control means to calculate a corresponding address in a logical memory segment in an associated one of said P-1 logical memory segments.

15. The memory media as recited in claim 12, wherein said array configuration data further includes a third entry which identifies one of said P storage devices as evidencing a failed operational state, and said third means further causes said control means, upon receiving a read command for data in a logical memory segment, to issue read commands to other disk drives evidencing an operational state, to read data at corresponding logical memory segment locations, and, upon receiving such data, regenerating data previously available from said disk drive evidencing a failed operational state.

16. The memory media as recited in claim 12, wherein each write command includes a configuration identifier and each array configuration page also includes a configuration identifier, said third means causing said control means to execute said write command only if each configuration identifier is the same.

* * * * *